United States Patent Office 2,973,249
Patented Feb. 28, 1961

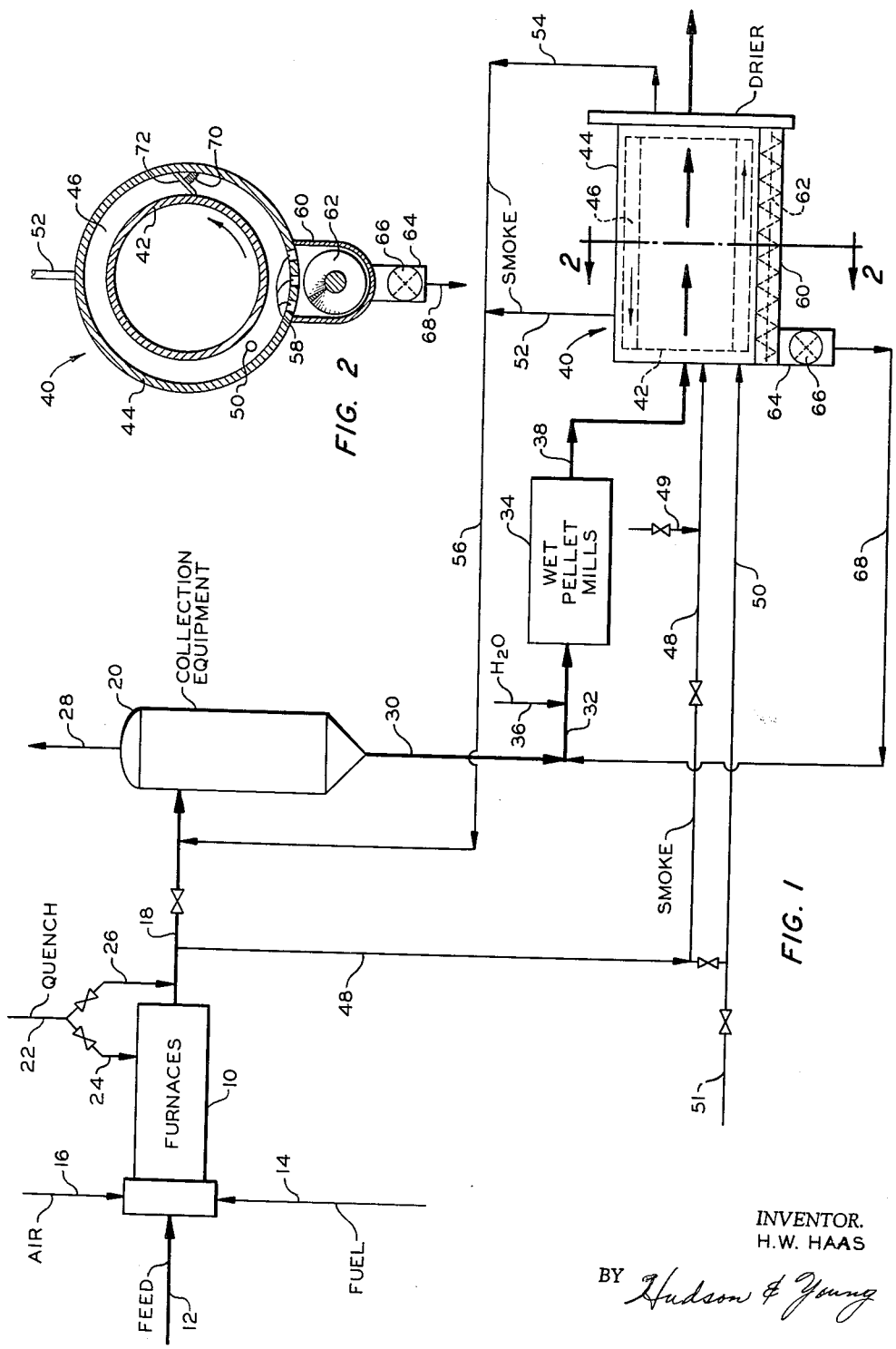

2,973,249

CARBON BLACK PROCESS AND APPARATUS

Harold W. Haas, Bartlesville, Okla., assignor to Phillips Petroleum Company, a corporation of Delaware Filed Oct. 15, 1958, Ser. No. 767,310

9 Claims. (Cl. 23—209.6)

This invention relates to the production of pelleted carbon black and to apparatus therefor.

Carbon black is conventionally produced by subjecting a fluid hydrocarbon fuel to partial combustion in a furnace-type reactor so as to burn a sufficient proportion of the fuel to maintain a furnace temperature in the range of about 2000 to 3000° F. and convert the carbon in the unburned fuel to carbon black. The effluent from the furnace is water quenched and passed to a carbon black collection system, usually including bag filters, from which the carbon black is passed in hot condition to a surge vessel for feeding to pelleting mills for conversion into small pellets to facilitate handling of the black in transportation and use.

One type of pelleting involves passing the loose carbon black from the collection system thru wet pelleting equipment usually comprising a series of pug mills which mix the black with water in sufficient quantity to form a moist carbon black containing from about 45 to 55 weight percent of water. The moist black is agitated and moved thru the pug mills or wet pelleting mills so that it is pelleted into small pellets and emerges from the outlet of the last pug mill in wet condition. The pellets are then conveyed to a rotating drum type dryer for the drying process which produces substantially dry pellets containing less than about one weight percent moisture. The drying step is effected by passing hot drying gas thru both the interior of the rotating drum and thru the annulus between the drum and the outer shell. Usually the drying gas is prepared by burning a hydrocarbon fuel such as natural gas in a furnace and admixing the effluent combustion gas with about 400 to 500 weight percent of air to reduce the temperature thereof from an outlet temperature of 3000 to 3400° F. to the range of about 500° to 750° or 800° F., suitable for effecting the drying process.

The application of James Q. Wood and Lyle W. Pollock, Serial No. 680,272, filed August 26, 1957, describes a wet pelleting and drying process applicable to the production of dry carbon black pellets, utilizing off-gas from a carbon black process as a portion of the drying gas.

The process of the invention comprises wet pelleting carbon black, passing the wet pellets to a rotating drum type dryer, and passing carbon black furnace effluent, before carbon black has been removed therefrom, thru the dryer to furnish heat for the drying process and to deposit carbon black on the pellets in the dryer and on the exterior surface of the drum so that it may be recovered and pelleted. The temperature of the furnace effluent is reduced to the range of about 500 to 750 or 800° F. by water quenching before passing the same to the dryer. The major portion of the furnace effluent is passed thru a carbon black collection system involving further reduction in the temperature of the furnace effluent by conventional means so that the black is readily recoverable by means of bag filters, cyclones, etc., as conventional in the art. The recovered black is passed thru conventional wet pelleting mills where it is admixed with water and formed into wet pellets for transfer to the dryer.

Effluent drying gas containing residual carbon is passed from the dryer to the collection equipment for recovery of the residual black which is passed to the pellet mills, along with the carbon black recovered directly from the furnace effluent. Black deposited on the exterior of the drying drum is scraped off and collected in any suitable manner for transfer to the feed line to the wet pellet mills.

The invention has a number of advantages over the prior art. It effects a substantial saving in fuel gas consumption by eliminating the necessity for producing combustion gas which conventionally is used for the drying step. The invention also reduces the amount of water required as quench water for the recovery process and, in rather arid areas, such as the panhandle area of Texas where carbon black is produced in substantial quantities, the cost of suitable water for quenching is substantial. The amount of quench water used is that required to control the drying temperature of the furnace effluent fed to the dryer. Another substantial advantage resulting from the invention lies in the fact that use of less water in quenching the furnace effluent results in lower volume of gas passed to the bag filters in the collection system, thereby increasing the capacity of existing collection equipment or making it possible to use smaller and less expensive collection equipment.

A more complete understanding of the invention may be had by reference to the accompanying schematic drawing of which Figure 1 shows a process flow and arrangement of apparatus for effecting the process of the invention; and Figure 2 is a vertical cross section thru the dryer taken on the line 2—2 of Figure 1.

Referring to Figure 1, numeral 10 designates one or more furnaces for producing carbon black each of which is provided with an oil feed line 12, a supplementary fuel line 14, and an air line 16. A gaseous effluent line 18 leads from the outlet end of furnace 10 to a carbon black collection system 20. A water line 22 provides for introducing quench water thru line 24 into the outlet end of the furnace and thru line 26 into effluent line 18. Effluent gas substantially free of carbon black is vented from collection system 20 via line 28 and recovered carbon black is passed into line 30 which feeds conveyor 32 leading into wet pellet mills 34. Water line 36 injects water into the conveyor to the wet pellet mills or directly into the first mill of the series, as desired. Conveyor line 38 leads from the last wet pellet mill in the series to rotary dryer 40. Dryer 40 is a conventional rotary dryer having an internally rotating drum 42 within shell 44 which provides an annulus 46 intermediate the shell and rotating drum for circulation of heating gas therethru. Line 48 connects furnace effluent line 18 downstream of the quench with the interior of drum 42 and a branch line 50 connects line 48 with the annulus 46 around drum 42. Lines 49 and 51 provide means for introducing auxiliary or substitute drying gas such as combustion gas to lines 48 and 50, respectively. Effluent drying gas or smoke from dryer 40 is passed from the annulus 46 thru line 52 and from the interior of drum 42 thru line 54 to line 56 for transfer to line 18 and passage thru collection system 20.

The bottom of shell 44 is slotted at 58 within screw conveyor 60 provided with screw 62. Conveyor outlet 64 is provided with a star feeder 66, or other suitable gas tight feeding device, which delivers carbon black scraped off the exterior surface of drum 42 to line 68 for transfer to conveyor 32 and delivery of the black to the wet pelleting system. Of course, shell 44 may be completely cut out and open within conveyor 60.

Figure 2 is a vertical cross section thru dryer 40 taken on the line 2—2 of Figure 1, showing shell 44, annulus 46, drum 42, and conveyor 60 containing screw 62. A scraper 72 is attached to the inner wall of shell 44 and is urged or biased against the outer surface of drum 42 by means of spring 70. Baffles (not shown) are conventionally utilized in annulus 46 to direct the flow of heating gas around the drum.

In operation of the apparatus shown in the drawing, carbon black is produced in conventional manner in furnaces 10 with injection of quench fluid into the effluent thru lines 24 and 26 to knock the temperature thereof down from the range of 2000 to 3000° F. to the range of about 500 to 800° F., suitable for use in dryer 40. A minor portion of the effluent from the furnaces is passed thru lines 48 and 50 to dryer 40 for use as hereinafter described. The remaining effluent is passed thru line 18 into conventional carbon black recovery equipment 20 to recover the carbon black entrained in the quenched gases. The off gas from the collection system is vented thru line 28 and the recovered carbon black is passed thru line 30 to conveyor 32 and is mixed therein with sufficient water (usually within the range of 45 to 55 weight percent of the mix) injected thru line 36 to facilitate wet pelleting of the flocculent black.

The wet mixture is pelleted in one or more wet pelleting mills 34 in conventional manner and the wet pellets are transferred thru conveyor line 38 to drum 42 of dryer 40. The wet pellets are maintained as a tumbling bed in drum 42 and are heated and contacted therein by smoke or carbon black-laden effluent gas from the furnace introduced thru line 48. The cooling of the furnace effluent in the dryer deposits carbon black on the pellets therein and the tumbling action compacts the deposited black onto and into the surface of the pellets as the drying progresses. Drum 42 is also heated externally by means of furnace gas introduced to annulus 46 thru line 50. Cooling of the black-ladened gas deposits carbon black on the exterior surface of drum 42 which is continuously removed by means of scraper 72 so that the disengaged black gravitates to the bottom of shell 44 where it passes thru slots 58 to conveyor 60 for transfer thru outlet 64 and line 68 to the wet pelleting equipment.

Effluent smoke or furnace gas from dryer 40 is transferred via lines 52 and 54 to line 56 for return to line 18 and passage thru the collection system 20 so that the residual carbon black is recovered and passed to the pelleting step.

Substantial benefits can be obtained from the invention by injecting carbon black furnace effluent as the heating gas thru either line 48 or 50 while utilizing any other suitable heating gas in the other one of these lines. For instance, ordinary combustion gas can be introduced thru line 49 for internal drying while utilizing the carbon black furnace effluent in line 50; or ordinary combustion gas may be introduced to line 50 thru line 51 while the carbon black laden gas is utilized in line 48 for injection into the interior of drum 42.

Certain modifications of the invention will become apparent to those skilled in the art and the illustrative details disclosed are not to be construed as imposing unnecessary limitations on the invention.

I claim:

1. A process for drying wet carbon black pellets which comprises passing said pellets thru a drying drum in contact with a hot drying gas; contacting the exterior surface of said drum with hot effluent gas from a carbon black furnace prior to recovery of any substantial amount of carbon black therefrom so as to heat said drum, dry said pellets, and deposit carbon black on said drum; and recovering the deposited carbon black from said drum.

2. The process of claim 1 including passing said effluent gas thru the interior of said drum as said drying gas, whereby additional carbon black is recovered from said gas and deposited on said pellets.

3. The process of claim 2 including passing effluent carbon-containing gas from said drum to a carbon black collection system and recovering residual carbon black therefrom.

4. The process of claim 1 wherein the temperature of said hot effluent is reduced to a temperature in the range of 500 to 750° F. before passing to said drum.

5. The process of claim 1 wherein hot effluent from a carbon black furnace is water quenched to a temperature in the range of 500 to 750° F. and the resulting hot gas is passed in separate streams thru said drum and in contact with the exterior surface thereof.

6. A process for producing pelleted carbon black comprising subjecting a fluid carbonaceous fuel to partial combustion with air to produce hot gaseous effluent containing carbon black; water-quenching said hot gaseous effluent to a temperature in the range of 500 to 750° F.; passing a first portion of the quenched effluent thru a carbon black recovery system to recover carbon black therefrom; pelleting recovered black in admixture with water to produce wet pellets; passing said wet pellets thru a rotating drum dryer; passing a second portion of said quenched effluent thru said drum in contact with said wet pellets to dry same; passing a third portion of said quenched effluent in contact with the exterior surface of said drum so as to heat same and dry said pellets and deposit part of the carbon black in said third portion on the outside of said drum; recovering deposited carbon black from the outside of said drum; passing effluent gas from within and from outside said drum thru said carbon black recovery system to recover residual carbon black therefrom; and passing the recovered carbon black to the wet pelleting step.

7. Apparatus for producing pelleted carbon black comprising a carbon black furnace; carbon black collection means for separating carbon black from the effluent from said furnaces; a wet pelleting mill; a drum type rotary dryer having separate gas circulation means thru the drum and around the drum; an effluent line leading from said furnace to said collection means; a take-off line connecting said effluent line with the interior and with the exterior of said drum for circulating hot carbon black-containing gas therethru; quench means upstream of said take-off line; a carbon black feed line leading from said collection means to said pelleting mill; means for injecting water into said pelleting mill; a pellet feed line connecting said mill with the drum of said dryer; and a dry product pellet line leading from said drum.

8. The apparatus of claim 7 including a gaseous effluent line leading from said dryer to said collection means for conveying drying gas containing residual carbon black to said collection means; scraping means for removing carbon black from the outside of said drum; and means for recovering the removed carbon black.

9. The apparatus of claim 8 including conveyor means for passing recovered black from said dryer to said pelleting mill.

References Cited in the file of this patent

UNITED STATES PATENTS

| | | |
|---|---|---|
| 134,659 | Gibbs et al. | Jan. 7, 1873 |
| 2,457,962 | Whaley | Jan. 4, 1949 |
| 2,538,482 | Studebaker | Jan. 16, 1951 |
| 2,695,837 | Benz | Nov. 30, 1954 |
| 2,880,519 | Pollack | Apr. 7, 1959 |